(12) United States Patent
Ishikawa et al.

(10) Patent No.: US 12,529,923 B2
(45) Date of Patent: Jan. 20, 2026

(54) DISPLAY DEVICE

(71) Applicant: Magnolia White Corporation, Tokyo (JP)

(72) Inventors: Makoto Ishikawa, Tokyo (JP); Takuya Nishimoto, Tokyo (JP); Masato Yoshida, Tokyo (JP); Toshihide Harada, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 141 days.

(21) Appl. No.: 18/618,325

(22) Filed: Mar. 27, 2024

(65) Prior Publication Data

US 2024/0329452 A1 Oct. 3, 2024

(30) Foreign Application Priority Data

Mar. 30, 2023 (JP) ................. 2023-054824

(51) Int. Cl.
*G02F 1/1333* (2006.01)
*G06F 1/16* (2006.01)

(52) U.S. Cl.
CPC ...... *G02F 1/133331* (2021.01); *G06F 1/1637* (2013.01); *G02F 2202/28* (2013.01); *G02F 2203/01* (2013.01)

(58) Field of Classification Search
CPC ............. G06F 1/1637; G02F 1/133331; G02F 1/133308; G02F 1/133314; G02F 1/133317; G02F 1/13332; G02F 1/133322; G02F 1/133328; G02F 2202/28
See application file for complete search history.

(56) References Cited

U.S. PATENT DOCUMENTS

| | | | | |
|---|---|---|---|---|
| 9,872,407 B2* | 1/2018 | Inobe | ........................ | H05K 5/03 |
| 9,946,104 B2* | 4/2018 | Ochi | .................. | G02F 1/133308 |
| 10,031,360 B2* | 7/2018 | An | ........................ | H05K 5/0217 |
| 11,982,908 B2* | 5/2024 | Zou | .................... | G02F 1/133308 |
| 12,135,474 B2* | 11/2024 | Harada | .............. | G02F 1/133331 |
| 2012/0262907 A1* | 10/2012 | Lee | ........................ | G06F 1/1637 |
| | | | | 361/807 |
| 2014/0232969 A1* | 8/2014 | Tsubaki | ............ | G02F 1/133308 |
| | | | | 156/305 |
| 2014/0240961 A1 | 8/2014 | Tsubaki et al. | | |
| 2015/0253615 A1* | 9/2015 | Ryu | .................. | G02F 1/133602 |
| | | | | 445/24 |

(Continued)

FOREIGN PATENT DOCUMENTS

JP 2014-164276 A 9/2014

*Primary Examiner* — Nidhi Thaker
(74) *Attorney, Agent, or Firm* — K&L Gates LLP

(57) ABSTRACT

A display device includes a cover panel having a display area and a peripheral area that differs from the display area, a display panel facing at least the display area of the cover panel, a support having a plurality of side walls that support the peripheral area of the cover panel, and an adhesive tape and an adhesive bonding the cover panel to the support. The side walls of the support are rectangular having a pair of long side portions provided along a long side and a pair of short side portions provided along a short side, the adhesive tape and the adhesive are provided between the long side portions and the cover panel, and the adhesive tape is provided and the adhesive is not provided between the short side portions and the cover panel.

8 Claims, 10 Drawing Sheets

(56) References Cited

U.S. PATENT DOCUMENTS

2018/0113352 A1* 4/2018 Arita .................... G02B 6/0055
2020/0233258 A1* 7/2020 Araki ................ G02F 1/133308
2021/0063807 A1* 3/2021 Araki .................. G02F 1/13332

* cited by examiner

DISPLAY DEVICE

CROSS-REFERENCE TO RELATED APPLICATION

This application claims the benefit of priority from Japanese Patent Application No. 2023-054824 filed on Mar. 30, 2023, the entire contents of which are incorporated herein by reference.

BACKGROUND

1. Technical Field

The present invention relates to a display device.

2. Description of the Related Art

There is a transmissive liquid crystal display device that displays images on a liquid crystal display panel by using light from a backlight unit placed on the back side of the liquid crystal display panel (see Japanese Patent Application Laid-open Publication No. 2014-164276 (JP-A-2014-164276)).

The liquid crystal display device (display device) of JP-A-2014-164276 includes a cover glass (cover panel), the liquid crystal display panel located on the back side of the cover glass, and the backlight unit located on the back side of the liquid crystal display panel. A cover glass support case (support) is placed outside the liquid crystal display panel and the backlight unit. The back of the cover glass is bonded to the surface of the cover glass support case.

In the display device, the cover panel is desirably more difficult to come off from the support.

SUMMARY

A display device according to an embodiment of the present disclosure includes a cover panel having a display area and a peripheral area that differs from the display area, a display panel facing at least the display area of the cover panel, a support having a plurality of side walls that support the peripheral area of the cover panel, and an adhesive tape and an adhesive bonding the cover panel to the support. The side walls of the support are rectangular having a pair of long side portions provided along a long side and a pair of short side portions provided along a short side, the adhesive tape and the adhesive are provided between the long side portions and the cover panel, and the adhesive tape is provided and the adhesive is not provided between the short side portions and the cover panel.

DETAILED DESCRIPTION

Figure 1:
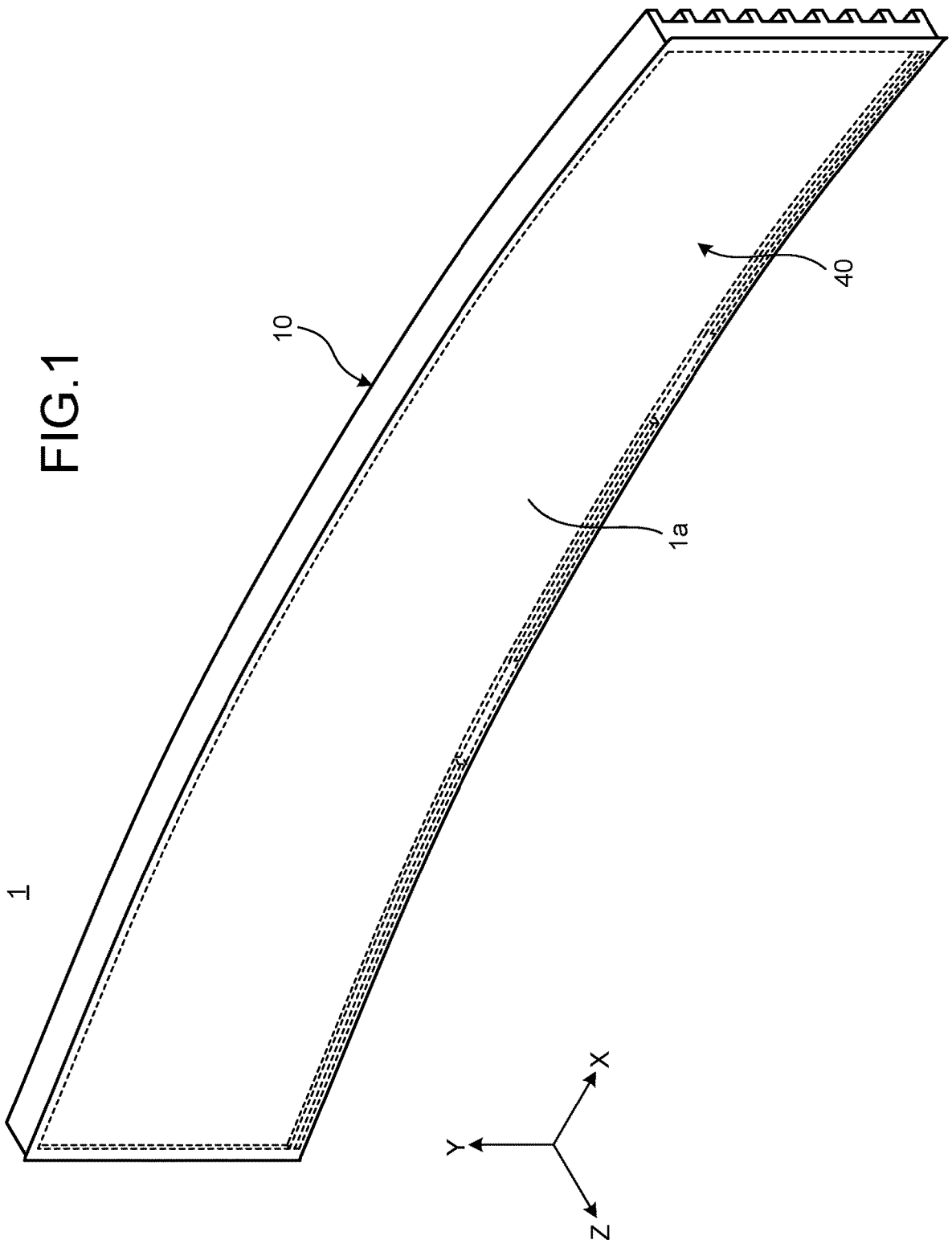
FIG. 1 is a perspective view of a display device according to a first embodiment.

Embodiments of the present invention will be described in detail with reference to the drawings. The present disclosure is not limited by what is described in the following embodiments. Components described below include those that can be easily assumed by a person skilled in the art and those that are substantially the same. Furthermore, the components described below can be combined as appropriate. What is disclosed herein is merely an example, and any appropriate modification that would easily be conceived of by a person skilled in the art, while maintaining the purport of the present disclosure, is naturally included in the scope of the present disclosure. The drawings may schematically illustrate the width, thickness, shape, and the like of each part compared with the actual mode for the sake of clarity of description, but this is merely an example and does not limit the interpretation of the present disclosure. In the present disclosure and the drawings, elements similar to those described previously with respect to the drawings already mentioned are given the same reference signs and the detailed description thereof may be omitted as appropriate.

In the present specification and the claims, to describe a mode in which another structure is placed on top of one structure, the term "on top of" simply shall, unless otherwise specified, include both cases in which another structure is placed directly above one structure so as to come in contact with one structure and in which another structure is placed above one structure with still another structure therebetween.

The X direction illustrated in the drawings is the width direction of a display device 1. The Y direction is the height direction of the display device 1 and is orthogonal to the X direction. The Z direction is the depth direction of the display device 1 and is orthogonal to the X and Y directions.

The +X and −X sides in the X direction and the +Y and −Y sides in the Y direction correspond to the lateral outside of the display device 1. The +Z side in the Z direction corresponds to a front surface 1a side on which an image is displayed in the display device 1, and the −Z side in the Z direction corresponds to the rear surface side of the display device 1.

In the present specification, a plan view refers to viewing the display device 1 from the +Z side along the Z direction. In the present specification, a plan view may refer to viewing the display device 1 from the +Z side along a direction orthogonal to the front surface 1a. Specifically, a plan view may refer to viewing the display device 1 from the +Z side along a virtual line passing through any given point located on the front surface 1a and orthogonal to the front surface 1a at the given point. The X, Y, and Z directions are examples, and the present disclosure is not limited to these directions.

First Embodiment

FIG. 1 is a perspective view of a display device according to a first embodiment. The display device 1 is a transmissive liquid crystal display device, and displays images on the front surface 1a on the basis of image data transmitted from an external device (not illustrated). The display device 1 is convexly curved to the −Z side. Specifically, in the display device 1, the section of the plane orthogonal to the Y direction is convexly curved to the −Z side, while the section of the plane orthogonal to the X direction is not curved but flat.

Figure 2:
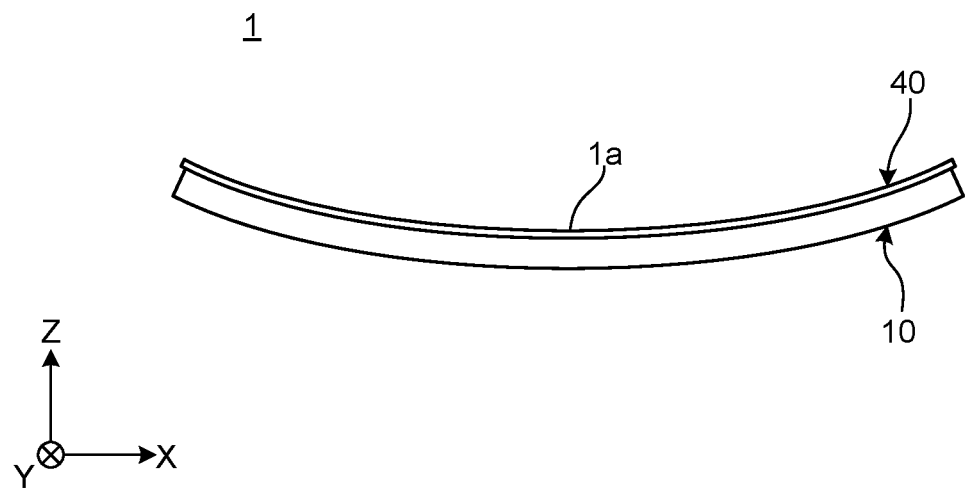
FIG. 2 is a side view of the display device.

FIG. 2 is a side view of the display device. The front surface 1a of the display device 1 is convexly curved to the −Z side with a substantially constant curvature in side view of the display device 1 from the −Y side illustrated in FIG. 2. The front surface 1a of the display device 1 is convexly curved to the −Z side with a substantially constant curvature in sectional view of the plane orthogonal to the Y direction. Not to mention, the curvature of the front surface 1a is not limited to a substantially constant curvature. The front surface 1a of the display device 1 is straight in the section view of the plane orthogonal to the X direction.

Figure 3:
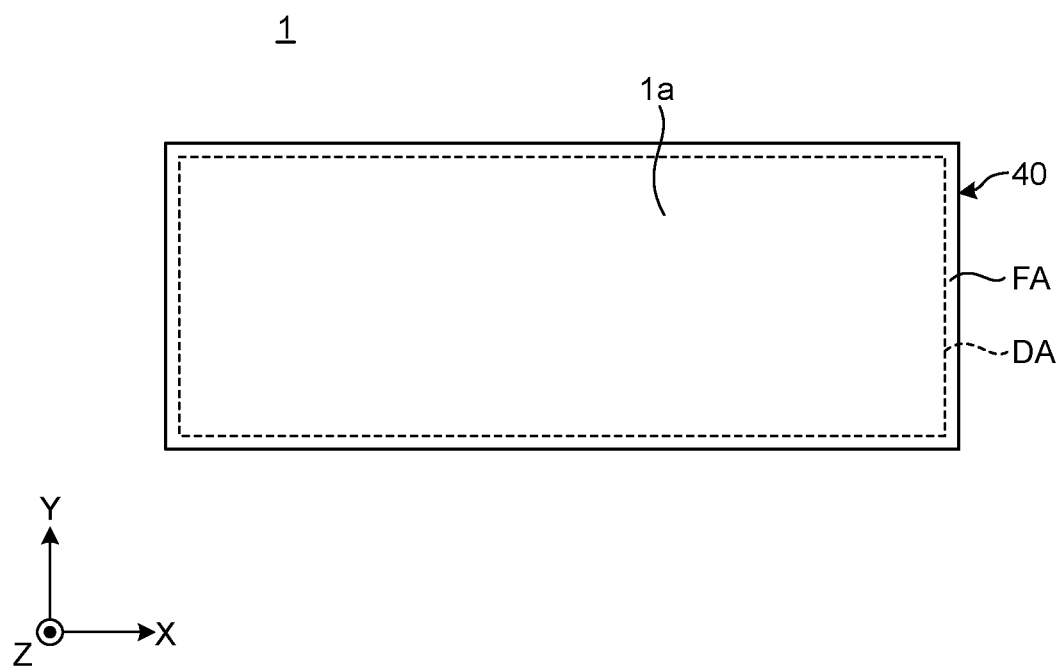
FIG. 3 is a plan view of the display device.

FIG. 3 is a plan view of the display device. The front surface 1a of the display device 1 has a display area DA in which images are displayed, and a peripheral area FA that differs from the display area DA. The display area DA is rectangular in plan view with the X direction as the longitudinal direction and the Y direction as the transverse direction. The peripheral area FA is an area between the periphery of the display area DA and the periphery of the front surface 1a.

Figure 4:
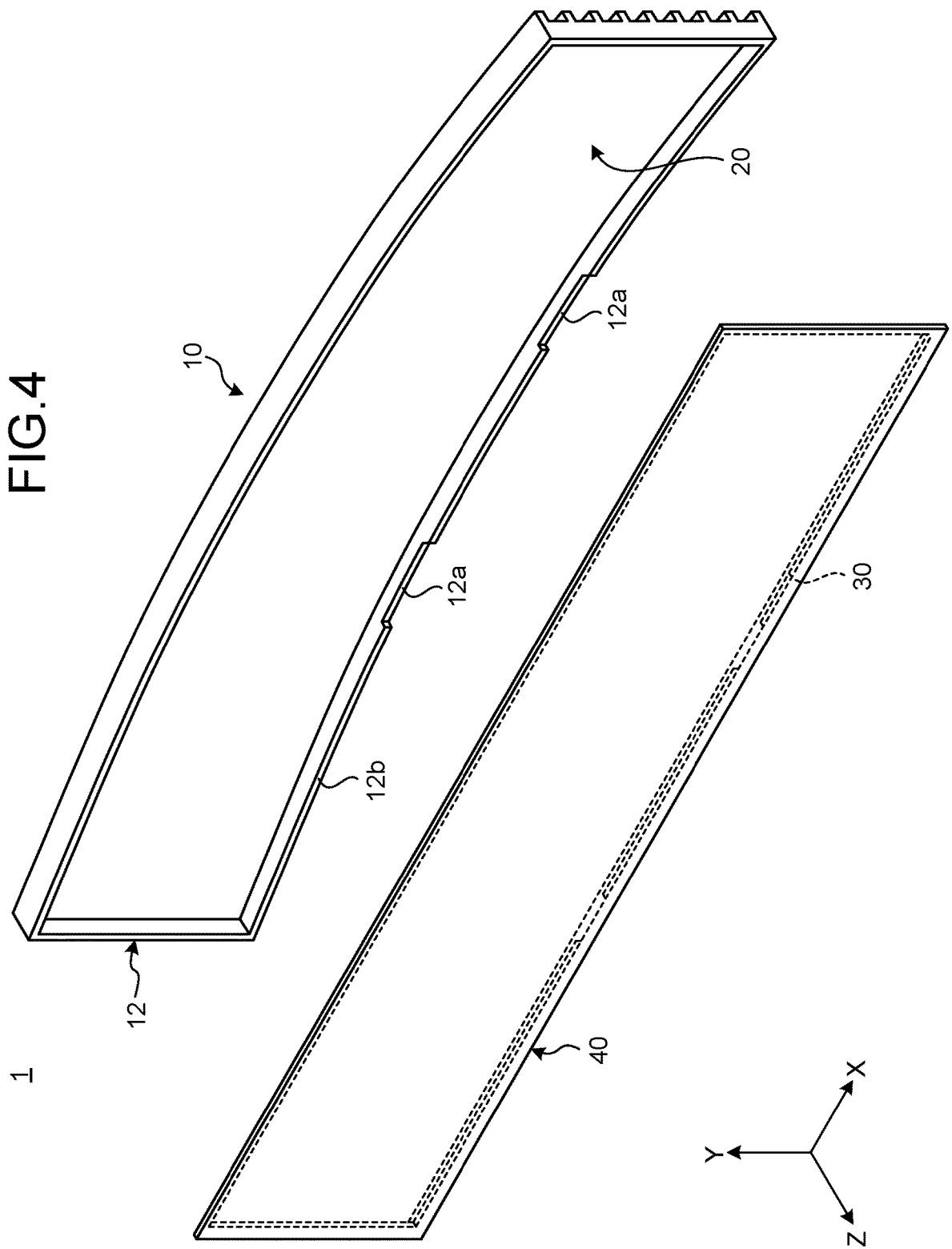
FIG. 4 is an exploded perspective view of the display device.
Figure 5:
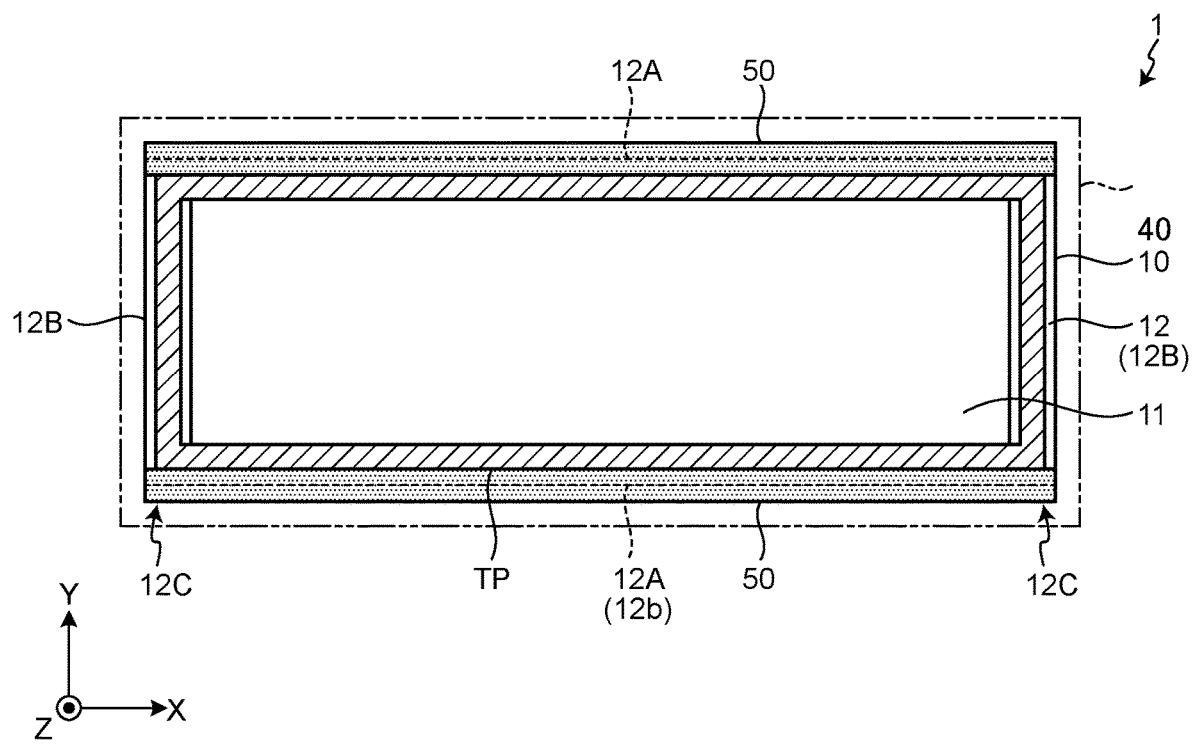
FIG. 5 is a plan view schematically illustrating a configuration of a cover panel, a support, an adhesive tape, and an adhesive of the display device according to the first embodiment.
Figure 6:
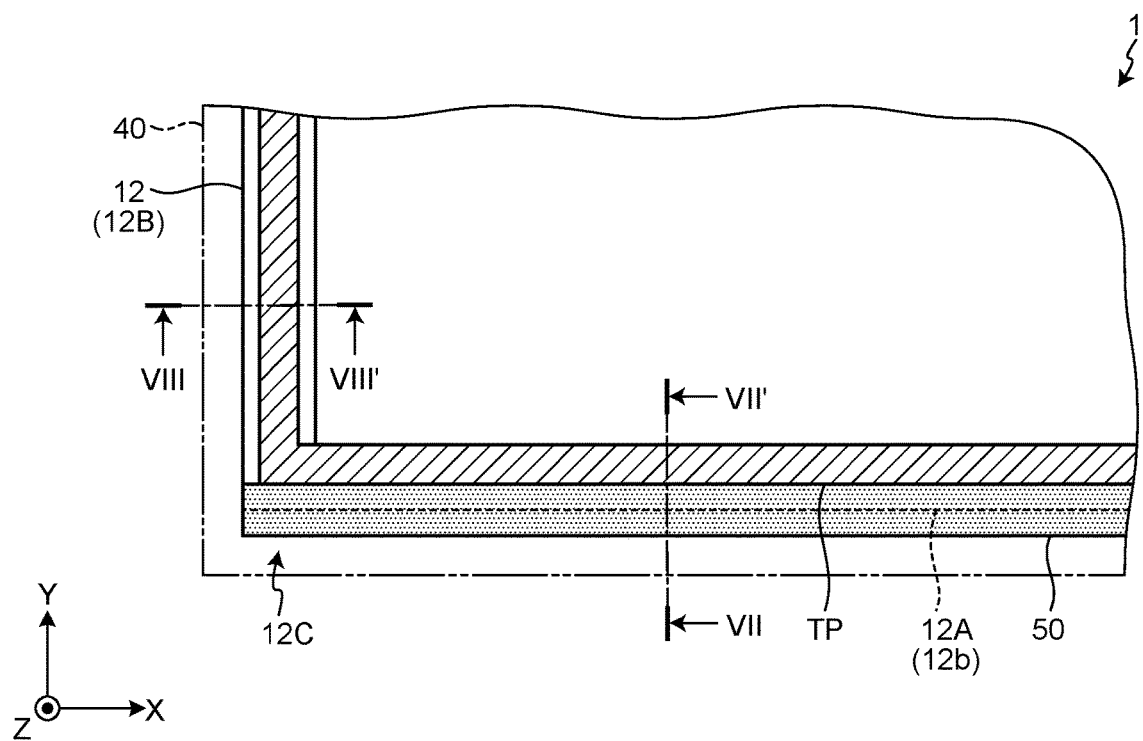
FIG. 6 is an enlarged plan view illustrating the vicinity of an intersecting portion of the support in FIG. 5.
Figure 7:
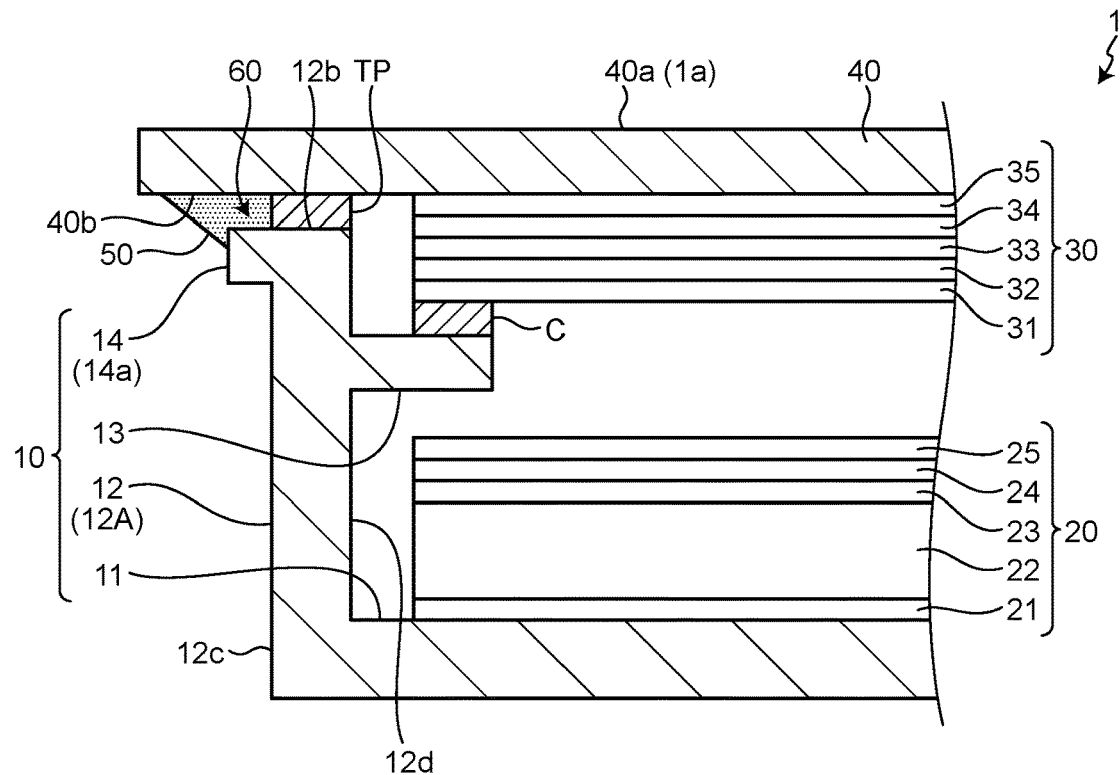
FIG. 7 is a sectional view of section VII-VII' of FIG. 6.
Figure 8:
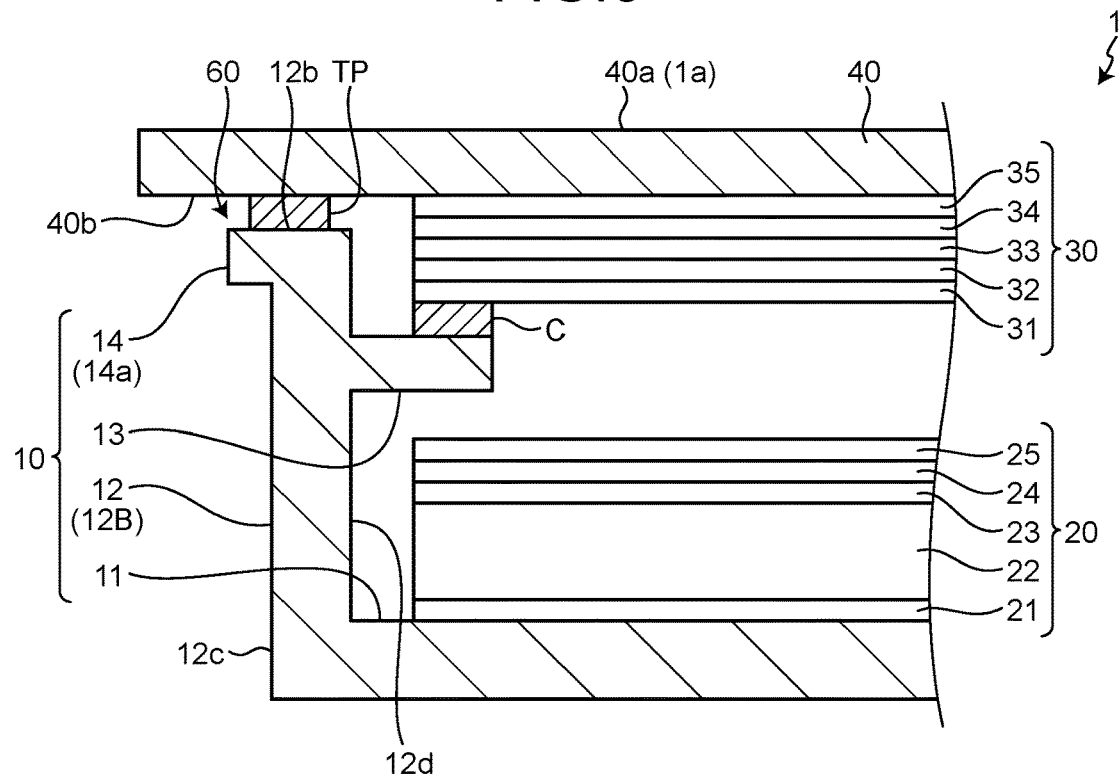
FIG. 8 is a sectional view of section VIII-VIII' of FIG. 6.

FIG. 4 is an exploded perspective view of the display device 1. FIG. 5 is a plan view schematically illustrating a configuration of a cover panel, a support, an adhesive tape, and an adhesive of the display device according to the first embodiment. FIG. 6 is an enlarged plan view illustrating the vicinity of an intersecting portion of the support in FIG. 5. FIG. 7 is a sectional view of section VII-VII' of FIG. 6. FIG. 8 is a sectional view of section VIII-VIII' of FIG. 6. A cover panel 40 and a support 10 are formed in a curved shape as described later, but the cover panel 40 and the support 10 are represented flat in FIGS. 7 and 8 for clarity of description.

As illustrated in FIG. 4, the display device 1 includes the support 10, a lighting device 20, a display panel 30, and the cover panel 40.

The support 10 is box-shaped with an opening on the +Z side, and is rectangular in plan view with the X direction as the longitudinal direction and the Y direction as the transverse direction. The support 10 is convexly curved to the −Z side, corresponding to the front surface 1a of the display device 1. The support 10 has a bottom wall 11 (see FIG. 7) and side walls 12. The bottom wall 11 is convexly curved to the −Z side, corresponding to the front surface 1a of the display device 1.

The side walls 12 are on the periphery of the bottom wall 11 and are rectangular in plan view. The bottom wall 11 and the side walls 12 are one piece. An end on the +Z side of the side wall 12 on the −Y side has two notches 12a. An end surface on the +Z side of the side wall 12 constitutes a support surface 12b.

The support surface 12b is convexly curved to the −Z side, corresponding to the front surface 1a of the display device 1. Specifically, the support surface 12b is convexly curved to the −Z side in section view of the plane orthogonal to the Y direction and straight in section view of the plane orthogonal to the X direction. The support surface 12b is substantially parallel to the front surface 1a of the display device 1 and has a curvature substantially equal to that of the front surface 1a of the display device 1. Furthermore, the support surface 12b is rectangular frame-shaped in plan view. The support surface 12b supports the cover panel 40 (details to be described later).

The lighting device 20 emits light toward the display panel 30. The lighting device 20 is placed at the inner bottom of the support 10 and is convexly curved to the −Z side, corresponding to the bottom wall 11. As illustrated in FIGS. 7 and 8, the lighting device 20 includes a reflective sheet 21, a light guiding plate 22, a first lens sheet 23, a second lens sheet 24, and a diffusion sheet 25. The reflective sheet 21, the light guiding plate 22, the first lens sheet 23, the second lens sheet 24, and the diffusion sheet 25 are stacked in this order from the −Z side toward the +Z side.

Light emitted from a light emitting body (for example, light emitting diode; not illustrated) placed inside the support 10 and laterally outside the light guiding plate 22 enters the light guiding plate 22. The reflective sheet 21 reflects light emitted from a surface on the −Z side of the light guiding plate 22 to the +Z side.

The first lens sheet 23 and the second lens sheet 24 enhance the directivity of light emitted from a surface on the +Z side of the light guiding plate 22. The diffusion sheet 25 appropriately diffuses the light emitted from the first lens sheet 23 and the second lens sheet 24. The lighting device 20 does not have to include the reflective sheet 21, the first lens sheet 23, the second lens sheet 24, and the diffusion sheet 25.

The display panel 30 is located on the +Z side from the lighting device 20. The display panel 30 faces at least the display area DA of the cover panel 40. More precisely, the display panel 30 is attached to the −Z side of the cover panel 40 at a position inside the X and Y directions from the support surface 12b and at a position superimposed on the lighting device 20 in the Z direction. The side wall 12 further has a projecting portion 13 that projects inward to the support 10. The projecting portion 13 is placed on an inner surface 12d of the side wall 12 facing the inside of the support 10. The projecting portion 13 supports the peripheral portion of the display panel 30 with a cushioning member C, which is, for example, foam, therebetween.

The display panel 30 modulates the light emitted from the lighting device 20 to display an image on the surface on the +Z side. The area in which the image is displayed on the display panel 30 substantially matches the display area DA in plan view.

The display panel 30 includes a first polarizing plate 31, a first substrate 32, a liquid crystal layer 33 having a plurality of liquid crystal molecules (not illustrated), a second substrate 34, and a second polarizing plate 35. The first polarizing plate 31, the first substrate 32, the liquid crystal layer 33, the second substrate 34, and the second polarizing plate 35 are stacked in this order from the −Z side toward the +Z side.

The light emitted from the lighting device 20 enters the first polarizing plate 31. The first polarizing plate 31 converts the incident light into linear polarization. Light transmitted through the first polarizing plate 31 passes through the first substrate 32 and enters the liquid crystal layer 33. The light incident on the liquid crystal layer 33 is modulated by controlling the orientation of the liquid crystal molecules on the basis of image data transmitted from the external device.

Light transmitted through the liquid crystal layer 33 passes through the second substrate 34 and enters the second polarizing plate 35. The second polarizing plate 35 transmits or blocks the incident light according to the state of the light modulated by the liquid crystal layer 33. This operation causes the image to be displayed on the surface on the +Z side of the display panel 30.

The display panel 30 and the lighting device 20 are electrically coupled to the external device through wiring boards such as flexible printed circuit boards, for example. For example, the wiring substrate, such as flexible printed circuit boards, pass through the notches 12a of the support 10.

The cover panel 40 protects the display panel 30. As illustrated in FIG. 3, the cover panel 40 has the display area DA and the peripheral area FA that differs from the display area DA. The cover panel 40 is made of translucent glass. The cover panel 40 may be made of a translucent resin.

The cover panel 40 is plate-shaped having a first surface 40a and a second surface 40b opposite the first surface 40a. The first surface 40a of the cover panel 40 is the front surface 1a of the display device 1. The second surface 40b of the cover panel 40 is a supported surface. The outer periphery of the second surface 40b is laterally outer side of the display device 1 than the outer periphery of the support surface 12b.

The front surface 1a of the display device 1 is curved as described above, and the cover panel 40 is curved corresponding to this curvature of the front surface 1a. The support surface 12b of the support 10 is curved corresponding to this curvature of the front surface 1a. Or equivalently, the cover panel 40 is curved corresponding to the support surface 12b of the support 10. That is, the cover panel 40 is convexly curved to the −Z side in section view of the plane orthogonal to the Y direction. In other words, the cover panel 40 is convexly curved to the support 10 side.

As illustrated in FIG. 4, the cover panel 40 is flat before being bonded to the support 10. Resulting from the second surface 40b of the cover panel 40 and the support surface 12b of the support 10 are bonded to each other with an adhesive tape TP therebetween, the cover panel 40 is bended (curved) as described above.

The cover panel 40 has a curved surface part, and the display panel 30 is curved and stuck along the cover panel 40. Specifically, the display panel 30 is attached to the cover panel 40 before being bonded to the support 10, and is flat with the cover panel 40 not bonded to the support surface 12b. The cover panel 40 is bonded to the support surface 12b, whereby the display panel 30 is curved together with the cover panel 40. Or equivalently, the display panel 30 is convexly curved to the −Z side, corresponding to the cover panel 40 with the cover panel 40 bonded to the support surface 12b.

A bonding structure of the support 10 and the cover panel 40 will be described next with reference to FIGS. 5 through 8. In FIGS. 5 and 6, the cover panel 40 is indicated by a dashed and double-dotted line and the adhesive tape TP and the adhesive 50 are hatched to make the drawings easier to read.

As illustrated in FIGS. 5 and 6, the side walls 12 of the support 10 are rectangular and support the peripheral area FA (see FIG. 3) of the cover panel 40. The side walls 12 have a pair of long side portions 12A extending along the long side of the support 10 and a pair of short side portions 12B extending along the short side of the support 10.

Furthermore, the side walls 12 have intersecting portions 12C at which the long side portion 12A and the short side portion 12B are coupled. The intersecting portions 12C are corners of the side walls 12. The width of the intersecting portion 12C in the Y direction is equal to the width of the long side portion 12A (width in the Y direction), and the width of the intersecting portion 12C in the X direction is equal to the width of the short side portion 12B (width in the X direction).

In the following description, when the long and short side portions 12A and 12B are not distinguished from the intersecting portion 12C, the intersecting portion 12C is included in the long side portion 12A and not included in the short side portion 12B. For example, "one end of the long side portion 12A in the extending direction" more specifically represents "an end of the intersecting portion 12C included in one end of the long side portion 12A in the extending direction".

The support surface 12b (top surface) of the long side portion 12A of the support 10 is formed to be concave, corresponding to the cover panel 40. Specifically, the long side portion 12A is formed in a curved shape so that the height at both ends in the extending direction is greater than the height at the central portion. The support surface 12b (top surface) of the short side portion 12B of the support 10 is formed to be flat.

The adhesive tape TP and the adhesive 50 bond the cover panel 40 to the support 10. The adhesive tape TP is a double-sided tape. The adhesive 50 is a thermoplastic adhesive. The material of the adhesive 50 is a thermoplastic resin (for example, ethylene vinyl acetate). Thus, the manufacturing facility is simple and the adhesive 50 is easy to handle. The material of the adhesive 50 may be an ultraviolet-curable resin. The adhesive strength of the adhesive 50 is greater than that of the adhesive tape TP.

As illustrated in FIGS. 5 and 6, the adhesive tape TP is provided to the long side portions 12A and the short side portions 12B. Specifically, the adhesive tape TP extends along the extending direction of the long side portion 12A and along the extending direction of the short side portion 12B. The adhesive tape TP is also provided to the intersecting portions 12C. The part of the adhesive tape TP extending along the long side portion 12A and the part extending along the short side portion 12B are coupled at the intersecting portion 12C.

The adhesive 50 is provided to the long side portions 12A and not to the short side portions 12B. More specifically, the adhesive 50 extends along the extending direction of the long side portion 12A and is provided continuously from one end of the long side portion 12A in the extending direction to the other end opposite the one end. The long side portion 12A also includes the intersecting portions 12C. In other words, the adhesive 50 is provided continuously from the intersecting portion 12C located on one end side of the long side portion 12A in the extending direction to the intersecting portion 12C located on the other end side of the long side portion 12A in the extending direction. In the long side portion 12A, the adhesive 50 and the adhesive tape TP are provided adjacently to each other in a direction orthogonal to the extending direction of the long side portion 12A.

The adhesive 50 is not provided to the short side portions 12B. However, the adhesive 50 is provided to a pair of the intersecting portions 12C coupled to both ends of the short side portion 12B in the extending direction. In the short side portion 12B, the adhesive tape TP alone is provided and the adhesive 50 is not adjacent to the adhesive tape TP.

As illustrated in FIG. 7, the adhesive tape TP and the adhesive 50 are provided between the support surface 12b (top surface) of the long side portion 12A and the second surface 40b of the cover panel 40. The adhesive 50 is provided adjacently to the adhesive tape TP between the support surface 12b (top surface) of the long side portion 12A and the second surface 40b of the cover panel 40. The adhesive 50 is placed laterally outer side of the display device 1 than the adhesive tape TP.

The support 10 further includes a flange 14. The flange 14 is provided protruding from an outer surface 12c of the side wall 12 at an upper end of the side wall 12. The support surface 12b also includes the top surface of the flange 14.

The adhesive 50 is provided filling a space 60 formed by the support surface 12b of the long side portion 12A (including the top surface of the flange 14), the side surface of the adhesive tape TP, and the second surface 40b of the cover panel 40. The side surface of the adhesive 50 is sloped in a tapered manner. The adhesive 50 is provided to cover a portion of a side 14a of the flange 14 and the vicinity of the outer periphery of the second surface 40b of the cover panel 40.

As illustrated in FIG. 8, the adhesive tape TP is provided between the support surface 12b (top surface) of the short side portion 12B and the second surface 40b of the cover panel 40. The adhesive 50 is not provided between the support surface 12b (top surface) of the short side portion 12B and the second surface 40b of the cover panel 40.

The adhesive 50 is applied after the support 10 is bonded to the cover panel 40 with the adhesive tape TP. The adhesive 50 is applied in a heated and softened state and spreads along the long side portion 12A to the space 60 as described above. The adhesive 50 then cures as the temperature of the adhesive 50 decreases.

In this manner, the adhesive 50 is provided along the long side portion 12A of the side wall 12, and the adhesive tape TP and the adhesive 50 are provided between the support surface 12b (top surface) of the long side portion 12A and the second surface 40b of the cover panel 40. This increases the adhesive strength between the support 10 and the cover panel 40 compared with a configuration in which the support 10 is bonded to the cover panel 40 with the adhesive tape TP alone.

The adhesive 50 is provided filling the space 60 formed by the support surface 12b of the long side portion 12A (top surface of the flange 14), the side surface of the adhesive tape TP, and the second surface 40b of the cover panel 40. This increases the contact area of the adhesive 50 and increases the adhesive strength of the support 10 and the cover panel 40. Thus, the cover panel 40 is more difficult to come off from the support 10.

More precisely, as illustrated in FIG. 7, the adhesive tape TP is placed laterally inner side of the display device 1 and the inner surface of the adhesive tape TP is placed so as to be aligned with the inner surface 12d of the side wall 12 at the support surface 12b of the long side portion 12A. As a result, the space 60 formed by the support surface 12b of the long side portion 12A (top surface of the flange 14), the side surface of the adhesive tape TP, and the second surface 40b of the cover panel 40 is formed larger than, for example, a case in which the adhesive tape TP is placed in the central portion of the support surface 12b in the width direction or laterally outer side of the display device 1, and the contact area with the adhesive 50 is increased.

The adhesive tape TP is provided to the central portion of the support surface 12b in the width direction at the short side portion 12B illustrated in FIG. 8. However, the location of the adhesive tape TP is not limited to this, and the adhesive tape TP may be located laterally inner side of the display device 1 or laterally outer side of the display device 1 because the adhesive 50 is not provided to the short side portions 12B.

The cover panel 40 is formed of glass, for example, and the support 10 is formed of aluminum (Al) or aluminum alloy (MgAl), for example. Thus, the cover panel 40 and the support 10 have a difference in linear thermal expansion. The difference in linear thermal expansion increases with the distance of the part at which the cover panel 40 is bonded to the support 10. Or equivalently, the difference in linear thermal expansion at the long side portion 12A is larger than that at the short side portion 12B. In the long side portion 12A, the difference in linear thermal expansion is larger closer to both ends in the extending direction than to the central portion in the extending direction. That is, the stress on the adhesive 50 produced by the difference in linear thermal expansion between the cover panel 40 and the support 10 is the greatest at both ends of the long side portion 12A, that is, the short side portion 12B.

In the present embodiment, the adhesive tape TP and the adhesive 50 are provided between the long side portions 12A and the cover panel 40. The adhesive tape TP alone is provided and the adhesive 50 is not provided to the short side portions 12B on which the stress due to the difference in linear thermal expansion between the cover panel 40 and the support 10 is applied most greatly. Consequently, in the display device 1 of the present embodiment, the adhesive tape TP and the long side portions 12A ensure adhesive strength at the long side portions 12A, in which stress due to the difference in linear thermal expansion is relatively small, while the adhesive tape TP alone is provided to the short side portions 12B, in which stress due to the difference in linear thermal expansion is large, so that unintended peeling and cracks of the adhesive 50 can be suppressed.

FIGS. 5 through 8 are schematic illustrations for clarity of description, and the thickness, width, and the like of the adhesive tape TP and the adhesive 50 can be modified as appropriate. In FIGS. 5 and 6, the adhesive tape TP and the adhesive 50 are continuous frames, but may be divided into a plurality of pieces as needed. In FIGS. 5 and 6, illustrations of the notches 12a (see FIG. 4) are omitted, but the adhesive tape TP and the adhesive 50 are applied at locations away from the notches 12a and not in the notches 12a.

Second Embodiment

Figure 9:
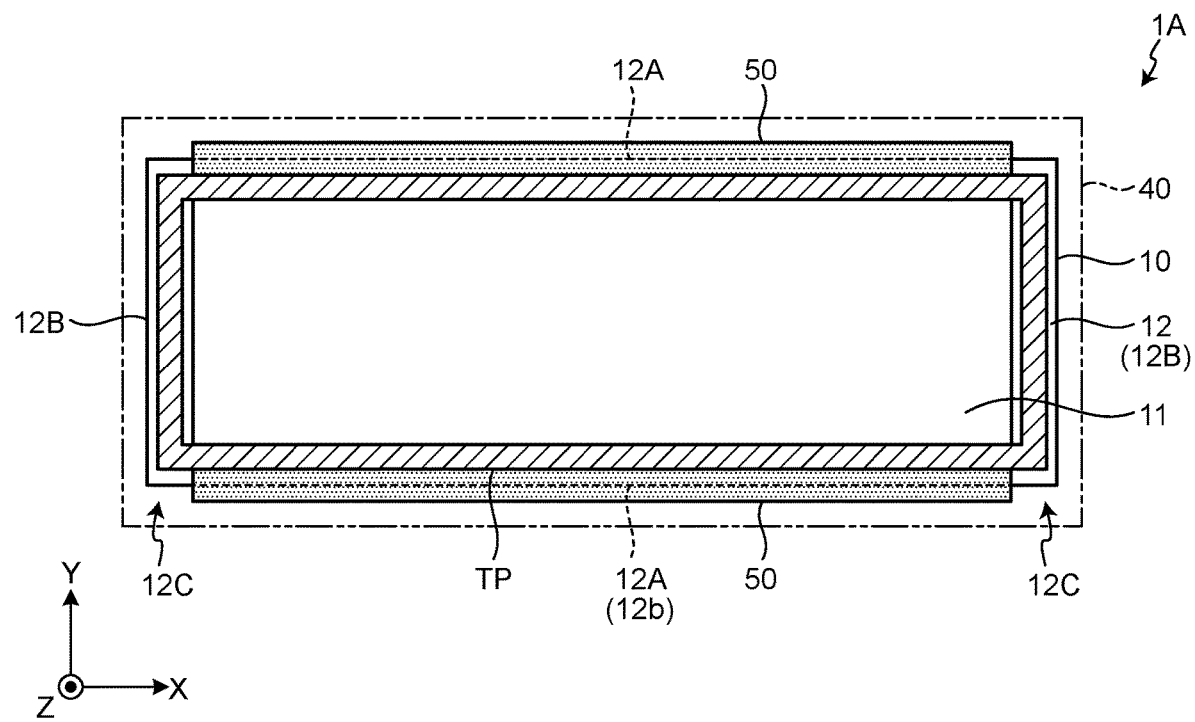
FIG. 9 is a plan view schematically illustrating a configuration of a cover panel, a support, an adhesive tape, and an adhesive of a display device according to a second embodiment.
Figure 10:
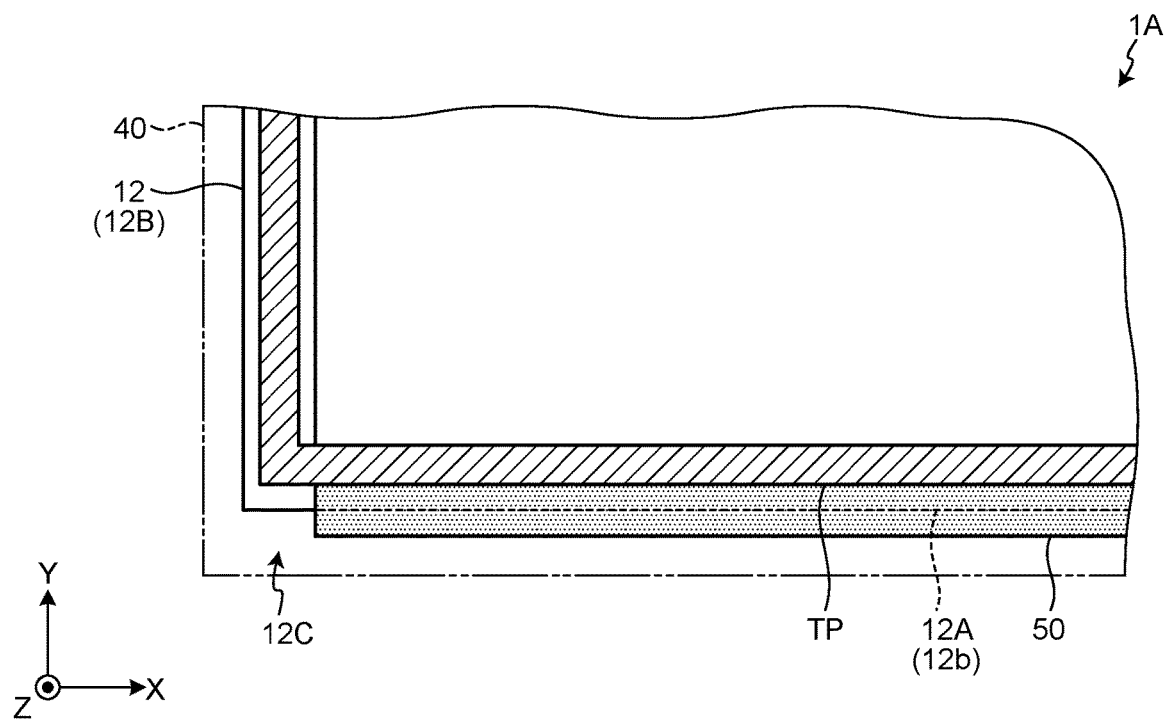
FIG. 10 is an enlarged plan view illustrating the vicinity of an intersecting portion of the support in FIG. 9.

FIG. 9 is a plan view schematically illustrating a configuration of a cover panel, a support, an adhesive tape, and an adhesive of a display device according to a second embodiment. FIG. 10 is an enlarged plan view illustrating the vicinity of an intersecting portion of the support in FIG. 9. In the following description, the same components as those described in the aforementioned embodiment will be given the same reference signs and duplicated descriptions will be omitted.

As illustrated in FIGS. 9 and 10, in a display device 1A according to the second embodiment, the adhesive 50 is provided along the extending direction of the long side portion 12A excluding the intersecting portion 12C. That is, the adhesive 50 is not provided to each of the intersecting portions 12C located at both ends of the long side portion 12A in the extending direction (more specifically, the intersecting portions 12C located at one end of each of the long side portion 12A and the intersecting portions 12C located at the other end opposite the one end).

The adhesive tape TP is provided to the long side portions 12A (including the intersecting portions 12C) and the short side portions 12B, similarly to the first embodiment. That is, the adhesive tape TP alone is provided and the adhesive 50 is not provided to the short side portions 12B, the intersecting portions 12C coupled to one end of each of the short side portions 12B, and the intersecting portions 12C coupled to the other end of each of the short side portions 12B.

Figure 11:
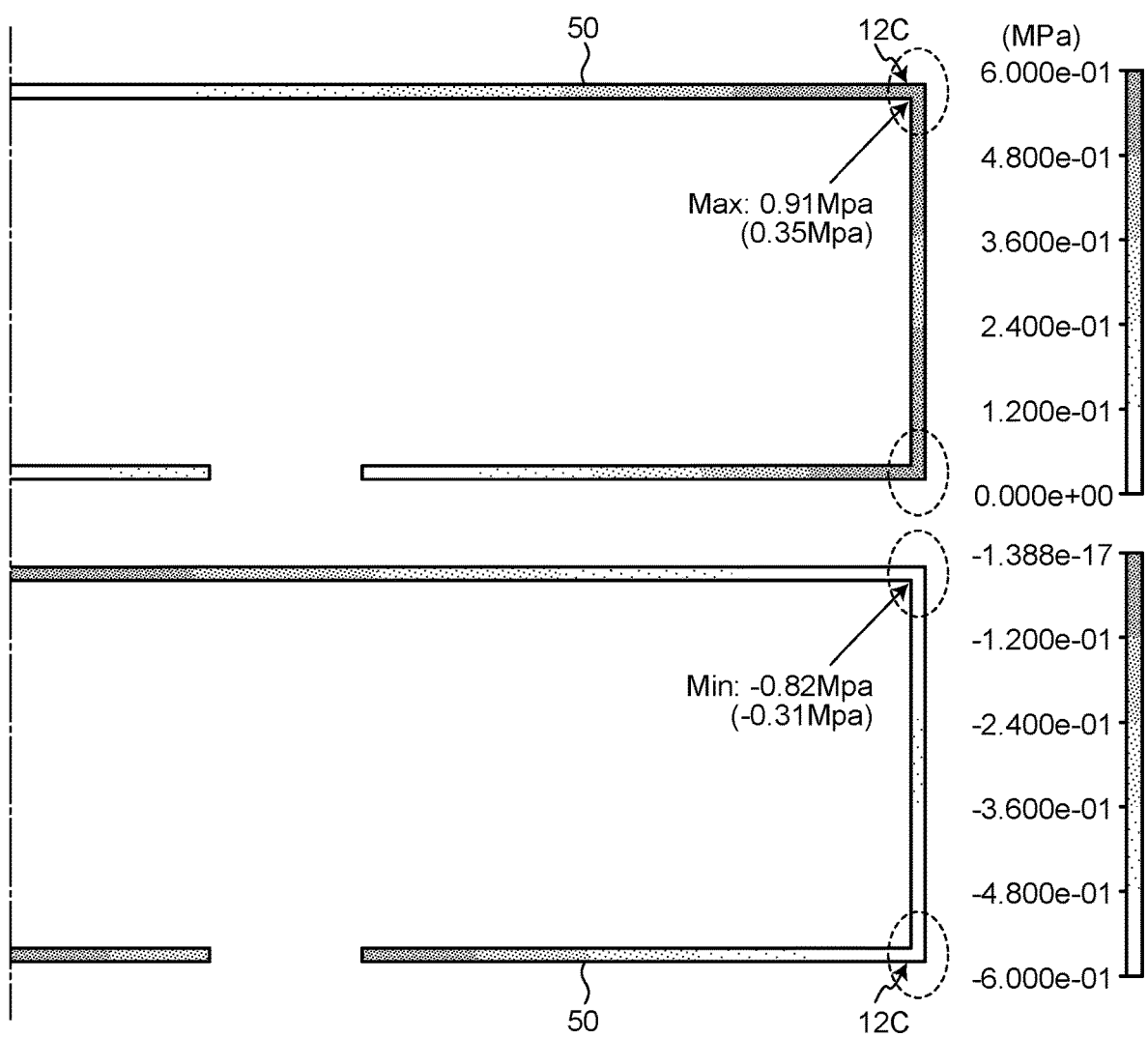
FIG. 11 is a diagram illustrating simulation results of an XY-directional stress produced on an adhesive of a display device according to a comparative example.

FIG. 11 is a diagram illustrating simulation results of an XY-directional stress produced on an adhesive of a display device according to a comparative example. The display device according to the comparative example illustrated in FIG. 11 has a structure with the adhesive 50 and the adhesive tape TP provided to the long side portions 12A (including the intersecting portions 12C) and the short side portions 12B. The XY-directional stress illustrated in FIG. 11 is a shear stress caused by the difference in linear thermal expansion between the cover panel 40 and the support 10. FIG. 11 illustrates the simulation results of stress distribution in reliability tests such as thermal shock tests, for example. The upper diagram of FIG. 11 illustrates the distribution of stress in a −40° C. environment, and the lower diagram of FIG. 11 illustrates the distribution of stress in an 85° C. environment.

As illustrated in FIG. 11, the stress produced on the adhesive 50 is greater at the short side portion 12B than at the long side portion 12A. The highest stress occurs at the intersecting portion 12C. Specifically, the stress increases closer to the end side (short side portion 12B side) in the long side portion 12A and the stress increases closer to the end side (long side portion 12A side) in the short side portion 12B.

In the present embodiment, the adhesive tape TP alone is provided and the adhesive 50 is not provided to the intersecting portions 12C, in which the stress due to the difference in linear thermal expansion is the greatest. With this configuration, in the present embodiment, the adhesive tape TP and the long side portions 12A ensure adhesive strength at the long side portions 12A excluding the intersecting portions 12C, while the adhesive tape TP alone is provided to the short side portions 12B and the intersecting portions 12C in which the stress is maximum, so that unintended peeling and cracks of the adhesive 50 can be suppressed.

Third Embodiment

Figure 12:
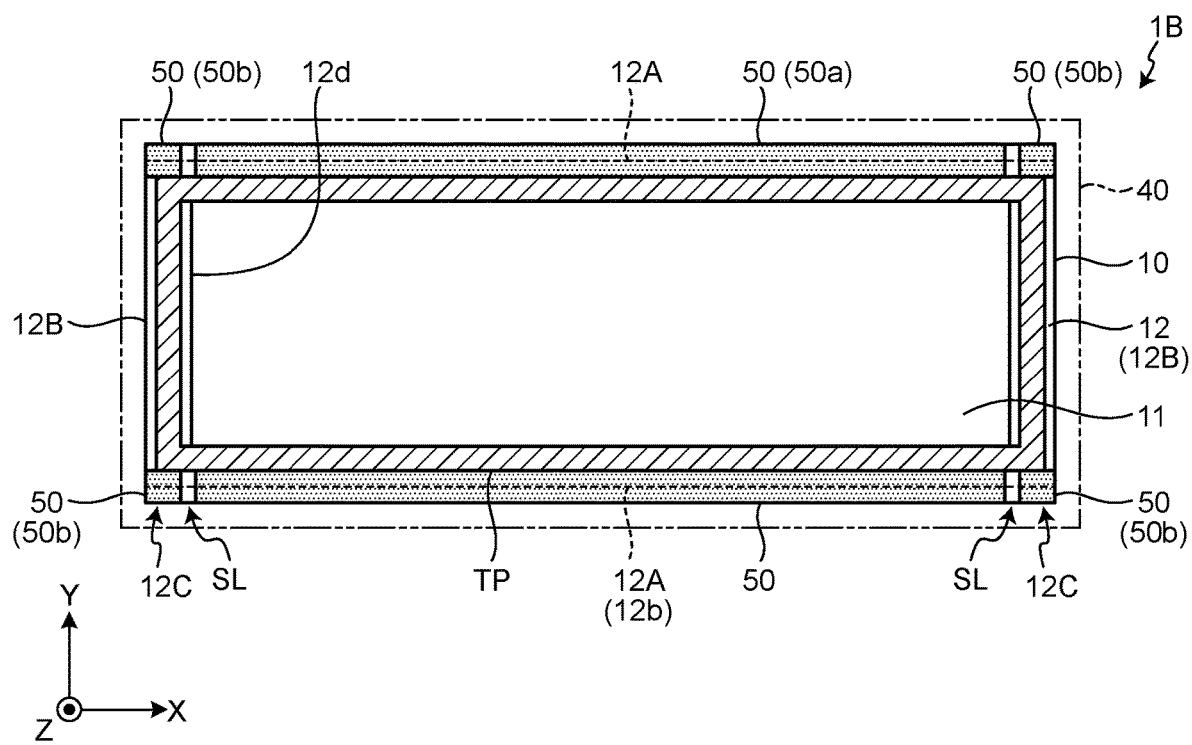
FIG. 12 is a plan view schematically illustrating a configuration of a cover panel, a support, an adhesive tape, and an adhesive of a display device according to a third embodiment.
Figure 13:
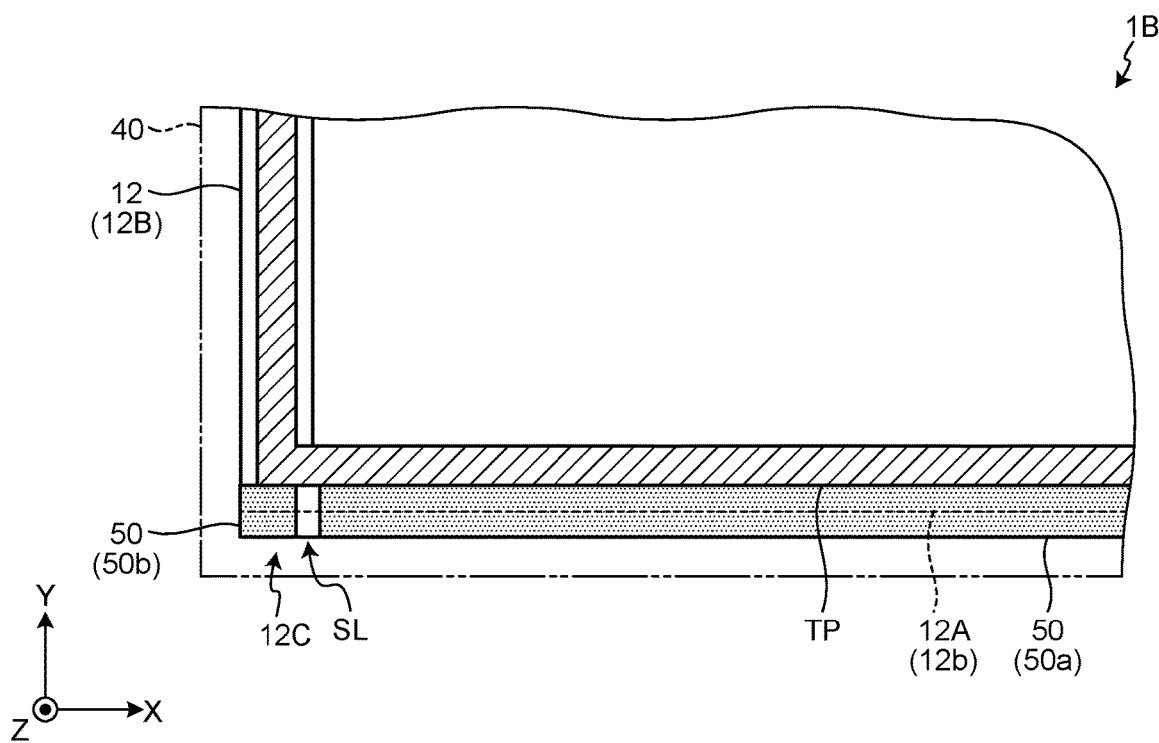
FIG. 13 is an enlarged plan view illustrating the vicinity of an intersecting portion of the support in FIG. 12.

FIG. 12 is a plan view schematically illustrating a configuration of a cover panel, a support, an adhesive tape, and an adhesive of a display device according to a third embodiment. FIG. 13 is an enlarged plan view illustrating the vicinity of an intersecting portion of the support in FIG. 12.

As illustrated in FIGS. 12 and 13, in a display device 1B according to the third embodiment, the adhesive 50 provided along the extending direction of the long side portion 12A (including the intersecting portions 12C) is divided into a plurality of pieces by slits SL. In the third embodiment, a plurality of the adhesives 50 are arranged from one end of the long side portion 12A, including the intersecting portion 12C, in the extending direction to the other end opposite the one end.

More specifically, at one long side portion 12A, the adhesive 50 has a first adhesive 50a provided along the extending direction of the long side portion 12A excluding the intersecting portion 12C and a second adhesive 50b provided to the intersecting portion 12C. The second adhesive 50b, the first adhesive 50a, and the second adhesive 50b are arranged in this order along the extending direction of the long side portion 12A. The first adhesive 50a and the second adhesive 50b are separated by the slit SL orthogonal to the extending direction of the long side portion 12A.

As a result, even if peeling or cracks of the second adhesive 50b occur at the intersecting portion 12C, in which the stress due to the difference in linear thermal expansion is the greatest, the slits SL provided can suppress the progress of peeling or cracks of the first adhesive 50a provided to the long side portion 12A (excluding the intersecting portion 12C).

The number and positions of the slits SL can be modified as appropriate. Three or more slits SL may be provided to one long side portion 12A (including the intersecting portion 12C). The slit SL is provided at a location that is a boundary of the intersecting portion 12C and that overlaps an extension of the inner surface 12d of the short side portion 12B. However, the location of the slit SL is not limited to this, and may be shifted to the central side of the long side portion 12A from the extension of the inner side 12d of the short side portion 12B.

Fourth Embodiment

Figure 14:
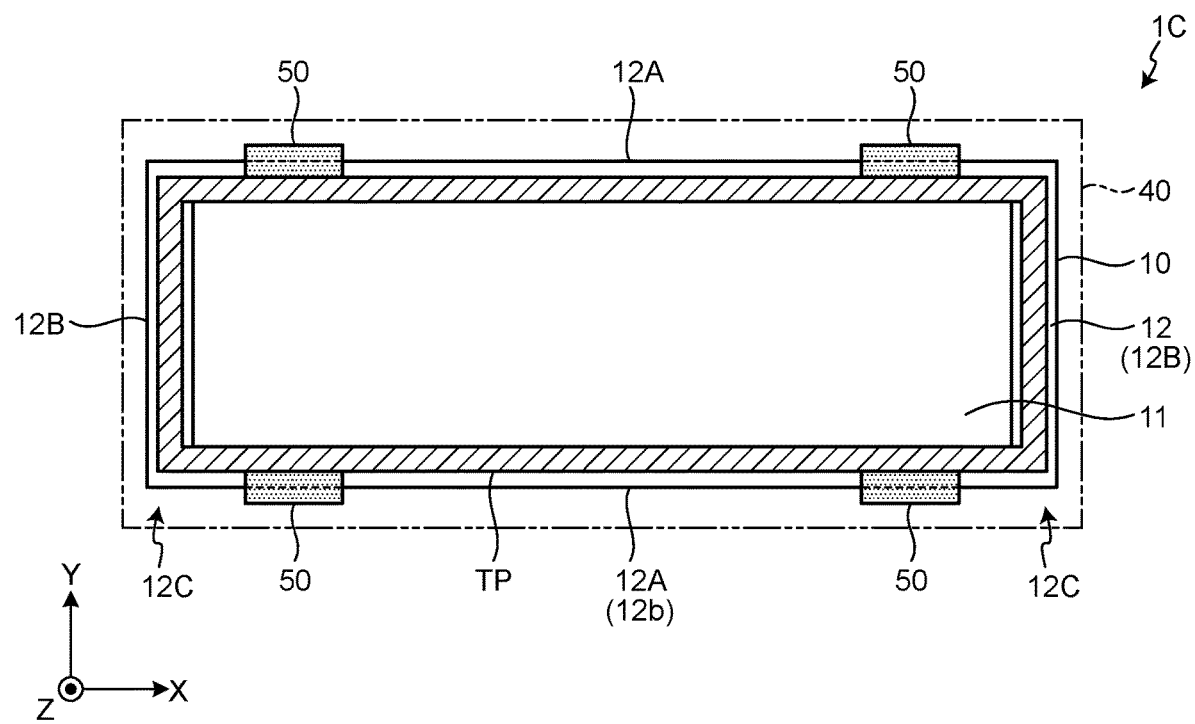
FIG. 14 is a plan view schematically illustrating a configuration of a cover panel, a support, an adhesive tape, and an adhesive of a display device according to a fourth embodiment.
Figure 15:
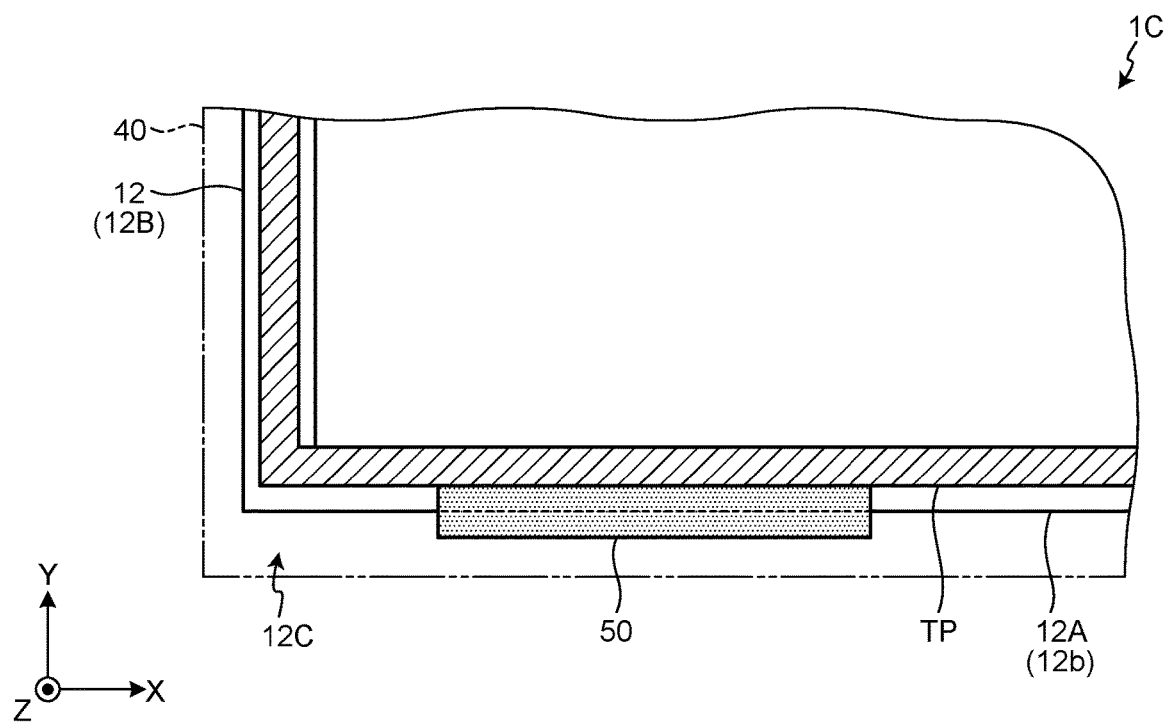
FIG. 15 is an enlarged plan view illustrating the vicinity of an intersecting portion of the support in FIG. 14.

FIG. 14 is a plan view schematically illustrating a configuration of a cover panel, a support, an adhesive tape, and an adhesive of a display device according to a fourth embodiment. FIG. 15 is an enlarged plan view illustrating the vicinity of an intersecting portion of the support in FIG. 14.

As illustrated in FIGS. 14 and 15, in a display device 1C according to the fourth embodiment, two adhesives 50 are placed so as to be separated from each other at one long side portion 12A. More specifically, the two adhesives 50 are provided so as to be separated with the central portion of the long side portion 12A in the extending direction interposed therebetween. The two adhesives 50 are not provided to the intersecting portion 12C, but are provided near the respective intersecting portions 12C located at both ends of the long side portion 12A in the extending direction, at the long side portions 12A excluding the intersecting portions 12C.

In the extending direction of one long side portion 12A, the interval between the two adhesives 50 is longer than the length of each of the adhesives 50. The length of the adhesive 50 in the extending direction is longer than the width of the intersecting portion 12C (that is, the length in the direction orthogonal to the extending direction of the short side portion 12B). The adhesive 50 is provided so as to be separated from a location that is a boundary of the intersecting portion 12C and that overlaps an extension of the inner surface 12d of the short side portion 12B. However, the adhesive 50 may be in contact with the boundary of the intersecting portion 12C.

Figure 16:
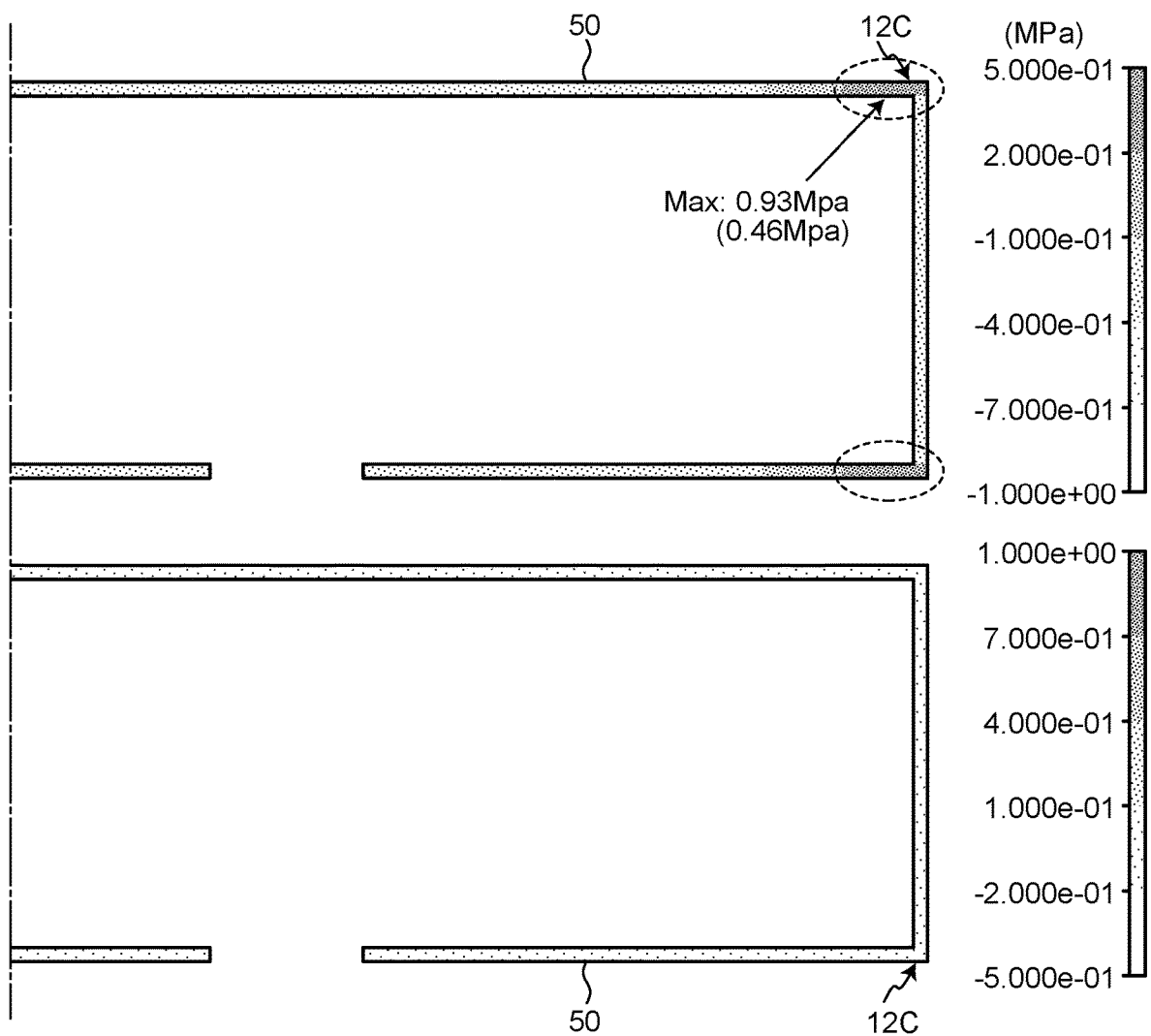
FIG. 16 is a diagram illustrating simulation results of a Z-directional stress produced on the adhesive of the display device according to a comparative example.

FIG. 16 is a diagram illustrating simulation results of a Z-directional stress produced on an adhesive of a display device according to a comparative example. FIG. 16 illustrates the distribution of the Z-directional stress, that is, the reaction force (force in the direction away from the support 10) produced on the cover panel 40, unlike FIG. 11.

As described above, the cover panel 40 is flat before being bonded to the support 10, and is convexly curved to the support 10 side and bonded to the support 10. Thus, the cover panel 40 bonded to the support 10 is subjected to an elastic force that tries to return it to a flat shape. As illustrated in FIG. 16, the Z-directional stress produced on the adhesive 50 is greater at a portion of the long side portion 12A near the intersecting portion 12C than at the central portion of the long side portion 12A. The Z-directional stress produced on the adhesive 50 is substantially constant at the central portion of the long side portion 12A and the short side portion 12B.

In the present embodiment, the adhesive 50 is provided to the long side portions 12A excluding the intersecting portions 12C, near the respective intersecting portions 12C, that is, parts in which the Z-direction stress is great. The adhesive 50 is not provided to the intersecting portions 12C, that is, parts in which the XY-directional stress is great (see FIG. 11). With this configuration, in the present embodiment, the adhesive tape TP and the adhesive 50 ensure adhesive strength and suppress peeling of the cover panel 40 at parts in which the Z-direction stress is great, while suppressing unintended peeling and cracks of the adhesive 50 at parts in which the XY-directional stress is great.

The length of the adhesive 50 in the extending direction and the number of the adhesives 50 provided to one long side portion 12A can be modified as appropriate according to the desired adhesive strength and the distribution of the XY-directional stress and Z-directional stress.

In the aforementioned embodiments, the configuration of the support 10 is merely an example and can be modified as appropriate. For example, the side wall 12 may not have the flange 14.

The display devices 1, 1A, 1B, 1C may be convexly curved to the +Z side. In this case, the support 10, the lighting device 20, the display panel 30, and the cover panel 40 are also convexly curved to the +Z side.

Although preferred embodiments of the present invention have been described above, the present invention is not limited to such embodiments. What is disclosed in the embodiments is merely an example, and various modifications can be made without departing from the intent of the present invention. Any appropriate modification made without departing from the intent of the present invention naturally belongs to the technical scope of the present invention. At least one of various omissions, substitutions, and modifications of the components can be made without departing from the spirit of the embodiments and modifications described above.

What is claimed is:

1. A display device comprising:
   a cover panel having a display area and a peripheral area that differs from the display area;
   a display panel facing at least the display area of the cover panel;
   a support having a plurality of side walls that support the peripheral area of the cover panel; and
   an adhesive tape and an adhesive bonding the cover panel to the support, wherein
   the side walls of the support are rectangular having a pair of long side portions provided along a long side and a pair of short side portions provided along a short side, the adhesive tape and the adhesive are provided between the long side portions and the cover panel, and
   the adhesive tape is provided and the adhesive is not provided between the short side portions and the cover panel.

2. The display device according to claim 1, wherein
   the adhesive tape is provided between a top surface of the long side portion and the cover panel and extends along an extending direction of the long side portion, and is provided between a top surface of the short side portion and the cover panel and extends along an extending direction of the short side portion, and
   the adhesive is provided to a space formed by at least the top surface of the long side portion, a side surface of the adhesive tape, and the cover panel.

3. The display device according to claim 1, wherein the adhesive extends along an extending direction of the long side portion and is provided continuously from one end of the long side portion in the extending direction to another end opposite the one end.

4. The display device according to claim 1, wherein
   the side walls have intersecting portions at which the long side portion and the short side portion are coupled, and
   the adhesive is provided along an extending direction of the long side portion excluding the intersecting portion, and is not provided to each of the intersecting portions located at both ends of the long side portion in the extending direction.

5. The display device according to claim 1, wherein
   the side walls have intersecting portions at which the long side portion and the short side portion are coupled,
   at one of the long side portions, the adhesive has a first adhesive provided along an extending direction of the long side portion excluding the intersecting portion and a second adhesive provided to the intersecting portion, and
   the first adhesive and the second adhesive are separated by a slit orthogonal to the extending direction of the long side portion.

6. The display device according to claim 1, wherein
   the side walls have intersecting portions at which the long side portion and the short side portion are coupled, and
   two adhesives are provided so as to be separated with a central portion of the long side portion in an extending direction interposed between the two adhesives, at one of the long side portions, and are provided near each of the intersecting portions located at both ends of the long side portion in an extending direction, at the long side portions excluding the intersecting portions.

7. The display device according to claim 1, wherein
   the cover panel has a curved surface part, and
   the display panel is curved and stuck along the cover panel.

8. The display device according to claim 7, wherein
   the cover panel is convexly curved to the support side,
   a top surface of the long side portion of the support is formed in a concave shape so that a height at both ends of the long side portion in an extending direction is greater than a height at the central portion, and
   a top surface of the short side portion of the support is formed to be flat.

* * * * *